United States Patent

[11] 3,583,218

[72] Inventor Clifford E. Van Nostrand, Sr.,
 Germantown, N.Y.
[21] Appl. No. 843,937
[22] Filed July 23, 1969
[45] Patented June 8, 1971
[73] Assignees Clifford L. Van Nostrand, Jr.,
 Virginia Beach, Va.;
 Joan M. Van Nostrand, Jr.; Edward P.
 Van Nostrand, both of Germantown, N.Y.

[54] VEHICLE AIR FILTER CONDITION INDICATOR
 6 Claims, 4 Drawing Figs.

[52] U.S. Cl. .................................................. 73/119,
 73/38, 73/209, 116/117
[51] Int. Cl. .................................................... G01m 15/00,
 G01n 15/08
[50] Field of Search ............................................. 73/38, 419,
 209, 403; 116/117, 70, 119

[56] References Cited
 UNITED STATES PATENTS
| | | | |
|---|---|---|---|
| 2,252,883 | 8/1941 | Everson | 73/209 |
| 2,557,072 | 6/1951 | Brewer | 73/209 |
| 3,024,655 | 3/1962 | Dwyer et al. | 73/209 |
| 3,172,746 | 3/1965 | Shuck | 116/70UX |

Primary Examiner—Louis R. Prince
Assistant Examiner—William A. Henry II
Attorneys—Clarence A. O'Brien and Harvey B. Jacobson ABSTRACT: A vertically disposed transparent airflow chamber with its inlet end disposed lowermost and having a lightweight airflow restricting member loosely received therein. The airflow restricting member is held captive within the chamber for free vertical movement therein and is "floatable" upwardly in the chamber in response to airflow through the chamber above a predetermined rate. The outlet end of the airflow chamber is communicated, by suitable duct means, with the air inlet chamber of a conventional automotive carburetor on the downstream side of the air cleaner filter operatively associated with the carburetor. The weight of the airflow restricting member and its cross-sectional area in relation to the internal cross-sectional area of the airflow chamber is computed so as to cause the airflow restricting member to be "floated" upwardly in the transparent airflow chamber as the airflow through the airflow chamber is increased above a predetermined value which is exceeded when the air filtering element of the associated carburetor is reduced in efficiency by an excess accumulation of dirt therein.

PATENTED JUN 8 1971
3,583,218
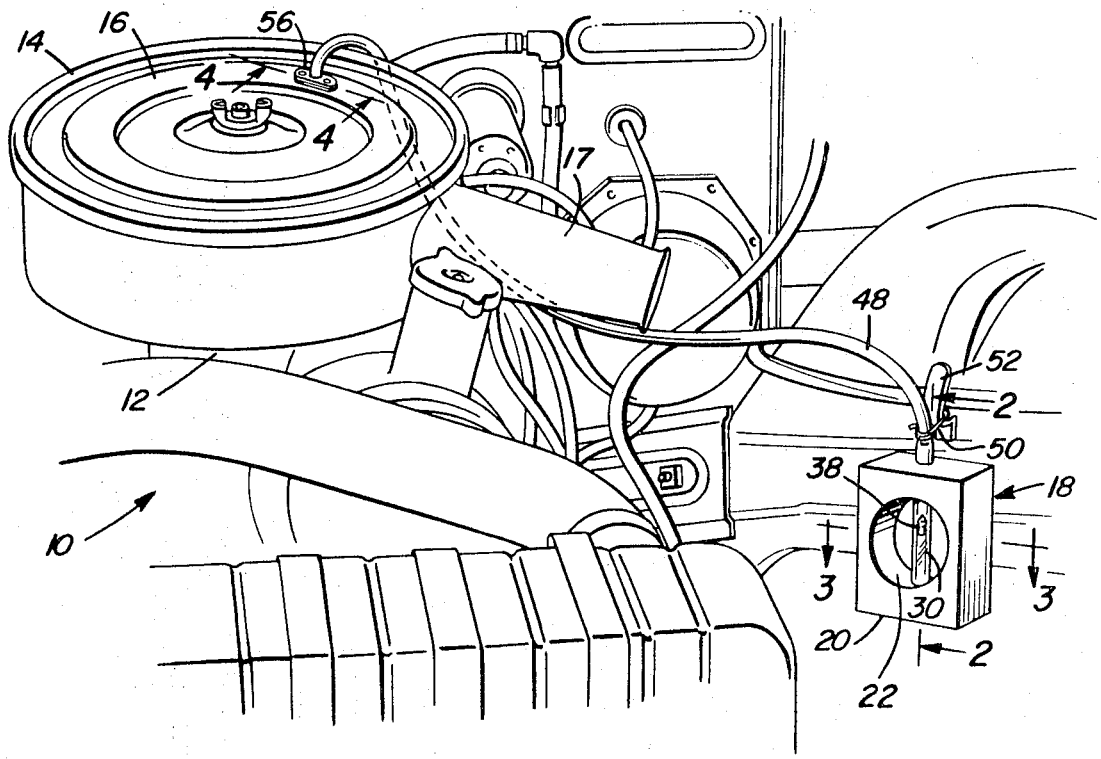
Fig. 1
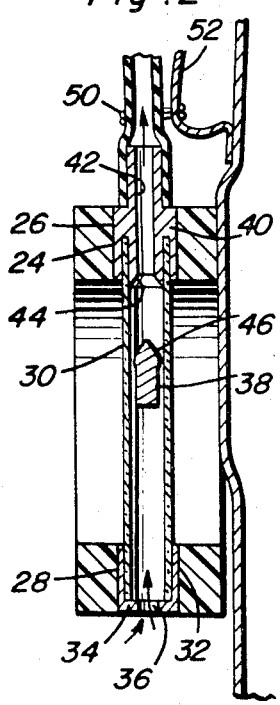
Fig. 2
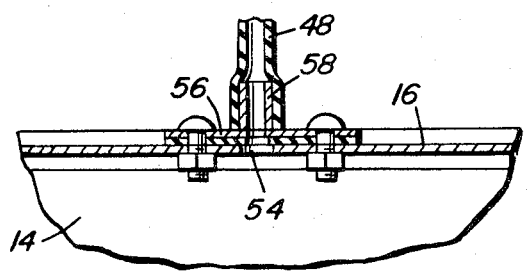
Fig. 4
Fig. 3
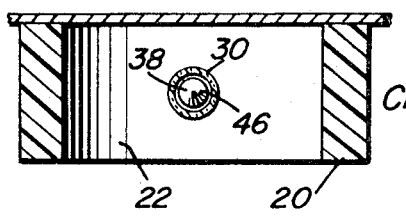
Clifford E. VanNostrand, Sr.
INVENTOR.
BY Clarence A. O'Brien
and Harvey B. Jacobson
Attorneys

VEHICLE AIR FILTER CONDITION INDICATOR

The vehicle air filter condition indicator defines a limited flow supplemental air intake communicated with the air intake passages of an associated automotive carburetor downstream from the air filter of the carburetor. In this manner, clogging of the air filter with dirt increases the vacuum present within the air inlet of the carburetor downstream from the air filter and results in a greater inflow of air through the air filter condition indicator. The indicator is provided with a transparent tubular airflow chamber which is elongated and vertically disposed and a "floatable" lightweight airflow restricting member is disposed within the airflow chamber. When the associated air filter is not clogged with dirt, the minimal amount of air passing upwardly through the airflow chamber is insufficient to cause the airflow restricting member to be floated upwardly in the airflow chamber. However, when the associated air filter becomes clogged with dirt, an increase of airflow through the air filter condition indicator is experienced due to the increase in vacuum in the area of the carburetor air intake downstream from the air filter with which the outlet of the air filter condition indicator is communicated. This increase in air flow through the air filter condition indicator causes the airflow restricting member to be floated upwardly in the transparent airflow chamber within which the airflow restricting member is retained captive and the indicator may therefore be utilized to accurately determined whether the associated air filter is offering excessive resistance to airflow therethrough by dirt entrapped within the air filter.

The air filter condition indicator is calibrated to be operative at engine idle speeds. Further, the filter air condition indicator includes a conical seating facing the airflow restrictive member at the outlet end of the airflow chamber within which the airflow restrictive member is held captive and the airflow restrictive member has a conical head on its end facing the seat and which is seatable against the latter when excessive vacuum within the air cleaner downstream from the air filter is present. After the airflow restrictive member has seated against the seat, the pressure differential acting upon the airflow restrictive member is sufficient to maintain the latter seated against the seat, even during operation of the associated engine at idle speeds. Therefore, the indicator automatically actuates itself to terminate the admittance of supplemental unfiltered air into the carburetor after the associated engine has been operated at speeds in excess of idle speeds. Accordingly, if a person desires to ascertain whether his air cleaner has been reduced in efficiency due to the accumulation of dirt thereon, he may start his engine without operating the latter at speeds appreciably higher than idle speeds and observe whether the airflow restricting member is "floated" upwardly in the airflow chamber. In addition, if the associated engine may not be started readily without exceeding engine idle speeds, the air inlet end of the airflow chamber may be readily temporarily blocked by placing a finger thereover so as to reduce the pressure differential on opposite sides of the airflow restricting member and to allow the latter to fall downwardly in the airflow chamber, after which the inlet of the airflow chamber may be unblocked and it may be observed whether the airflow restricting member is then "floated" upwardly in the transparent airflow chamber while the engine is idling.

The main object of this invention is to provide a means whereby the condition of an automotive air filter may be readily ascertained.

Another object of this invention is to provide a means in accordance with the preceding object and operative in response to an increase of carburetor intake vacuum downstream of the associated air filter due to the air filter being clogged by dirt.

Still another object of this invention is to provide an air filter condition indicator which may be readily utilized in conjunction with substantially all automotive engines and which will also indicate when the wrong air filter element of reduced airflow capacity is being utilized even when the wrong air filter element is not clogged with dirt.

A final object of this invention to be specifically enumerated herein is to provide a vehicle air filter condition indicator which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of a conventional vehicle engine compartment with the vehicle air filter condition indicator operatively associated with the air filter of the vehicle;

FIG. 2 is an enlarged fragmentary vertical sectional view taken substantially upon a plane indicated by section line 2-2 of FIG. 1;

FIG. 3 is an enlarged horizontal sectional view taken substantially upon the plane indicated by section line 3-3 of FIG. 2; and FIG. 4 is an enlarged fragmentary vertical sectional view taken substantially upon the plane indicated by section line 4-4 of FIG. 1.

Referring now more specifically to the drawings the numeral 10 generally designates a conventional form of motor vehicle engine including a carburetor 12 having an inlet neck (not shown) upon which an air filter housing 14 of conventional design is secured. The air filter housing 14 is provided with the usual removable top 16 and air inlet horn 17. Within the housing 14 and beneath the top 16 there is disposed an air filter element (not shown) and the air taken inwardly through the air horn 17 must pass through the air filter element before it passes into the carburetor 12.

The vehicle air filter condition indicator of the instant invention is generally referred to by the reference numeral 18 and includes a body 20 which is disposed upright and has a large diameter horizontal bore 22 formed therethrough. The body 20 has a vertical bore 24 formed therethrough whose center axis coincides with a diameter of the bore 22 and the bore 24 therefore includes opposite end portions 26 and 28 whose adjacent ends open into diametrically opposite portions of the bore 22.

An elongated tubular airflow chamber 30 constructed of transparent material is provided and has its lower end secured within the lower end portion 28 of the bore 24 by means of a fitting 32 in which the lower end of the chamber 30 is secured and which in turn is secured in the lower end portion 28 of the bore 24. The fitting 32 includes a bottom wall 34 which is centrally apertured as at 36 and the chamber 30 has a lightweight airflow restrictive member 38 loosely disposed therein for vertical movement. The end wall 34 prevents the member 38 from falling out of the lower end of the chamber 30 and the upper end of the chamber 30 is secured within the upper portion 26 of the bore 24 by means of a fitting 40 in which the upper end of the chamber 30 is secured and which in turn is secured through the bore 26. The fitting 40 has an upstanding bore 42 formed therethrough and the lower end of the bore terminates in a conical seat 44. The upper end of the member 38 defines a conical head 46 and the head 46 is seatingly engageable with the seat 40. However, the head 46 is more sharply pointed than the seat 44 so as to reduce the possibility of the head 46 sticking within the seat 44 upon seated engagement of the head 46 with the seat 44.

A flexible air impervious tubular conduit 48 is provided and the inlet end of the conduit 48 is telescoped over the upper exposed end of the fitting 40. A wire ring 50 is encircled about the conduit 48 and is supported from an existing wire loom support clip 52 disposed in the engine compartment.

The top 16 of the housing 14 has a small diameter opening 54 formed therethrough whose inner end is communicated with the interior of the carburetor air intake downstream from the air filter element within the housing 14. A fitting 56 is secured to the top 16 over the opening 54 and includes a tubular neck 58 which is registered with the opening 54 and has the outlet end of the conduit 48 telescoped thereover.

In operation, when it is desired to check the efficiency of the air filter element within the housing 14, the engine 10 is started without being accelerated past engine idle speeds. Then, the transparent airflow chamber 30 is viewed in order to ascertain whether the member 38 has been "floated" upwardly within the chamber 30. If the member 38 remains in the lower end of the chamber 30, an indication is given that the air filter element within the housing 14 is still operating efficiently without causing excessive restriction to the passage of inlet air therethrough. However, if the member 38 has been floated upwardly in the manner illustrated in FIGS. 1 and 2 of the drawings, an indication is given that the air filter element within the housing 14 is not operating efficiently and is excessively restricting the flow of air therethrough.

If for any reason the engine 10 cannot be started without exceeding engine idle speeds, there is a possibility that the member 38 will be floated upwardly into engagement with the seat 44 as the engine 10 is started. When this occurs, the pressure differential existent is sufficient to maintain the member 38 seated against the seat 44 even when the engine 10 is idling. When this occurs, it is merely necessary to place a finger over the opening 38 so as to momentarily cause a buildup of vacuum within the airflow chamber 30 below the seat 44 so as to thus reduce the pressure differential and allow the member 38 to fall by gravity to the bottom or end wall 34. Of course, in order for a vacuum to buildup within the portion of the airflow chamber 30 disposed below the seat 44, there necessarily must be some leakage of air past the member 38 when a finger is placed over the opening 36. However, inasmuch as operation of the engine 10 above engine idle speeds will cause the member 38 to be floated upwardly within the airflow chamber 30 even when the air filter element is operating efficiently, as soon as the engine 10 is accelerated above engine idle speeds after being started, the ingress of unfiltered air into the carburetor intake is terminated by the seating of the member 38 against the seat 44. The member 38 will be maintained in seated engagement with the seat 44 until such time as the operation of the engine 10 is terminated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An airflow responsive meter including an upstanding transparent tubular member including open upper and lower ends, the lower end of said tubular member being adapted for communication with the ambient atmosphere, an excessive airflow indicating member loosely slidably disposed in said tubular member and constructed of light material, said airflow indicating member being floatable upwardly in said tubular member in response to upward flow of air therethrough above a predetermined rate, said meter including stop means at the upper end of said tubular member engageable by said airflow member to limit upward travel of the latter in said tubular member, said stop means comprising a portion carried by the upper end of said tubular member having an outlet bore formed therethrough whose inlet end includes a downwardly facing valve seat, the upper end of said airflow indicating member including means defining a valve head seatingly engaged with said seat when the airflow indicating member is in its upper limit position and operative to substantially block the passage of air from said tubular member through said outlet bore, the lower end of said tubular member being adapted to be momentarily manually blocked against the passage of air thereinto, a source of engine carburetor intake vacuum downstream of an air cleaner element operatively associated with said carburetor intake and with which the outlet end of said outlet bore is communicated.

2. The combination of claim 1 wherein said meter includes abutment means at the lower end of said tubular member engageable by said airflow indicating member to limit downward travel of the latter in said tubular member.

3. The combination of claim 1 wherein said tubular member is supported from a body having a large diameter horizontal bore formed therethrough, said tubular member being disposed generally on a diameter of said bore intermediate its opposite ends and with the upper and lower ends of said tubular member being embraced by portions of said body.

4. The combination of claim 1 wherein said seat is conical and said head is also conical, the inclined conical surface portions of said seat being such that said head seats against the minor diameter end portion of said seat.

5. The combination of claim 1 wherein the weight of the airflow indicating member and its cross-sectional area in relation to the internal cross-sectional area of the tubular member is such as to cause the airflow indicating member to be buoyed upwardly in said tubular member as the airflow through the tubular member is increased above a predetermined value exceeded at engine idle speed when said air cleaner element is reduced in efficiency by an excess accumulation of dirt therein.

6. The combination of claim 1 wherein the weight of the airflow indicating member and its cross section area in relation to the internal cross-sectional are of the tubular member is such as to cause the airflow indicating member to be buoyed upwardly in said tubular member as the air flows through the tubular member is increased above a predetermined value exceeded at engine idle speed when said air cleaner element is reduced in efficiency by an excess accumulation of dirt therein, and the indicating member is buoyed upwardly through said tubular member, when the efficiency of the air cleaner element is not reduced, into seated engagement with said seat about an increase in carburetor intake vacuum as a result of the associated carburetor throttle valve being opened and the resultant pressure differential acting upon said indicating member is thereafter operable to maintain the indicating member in seated engagement with said seat even during engine idling operations until the associated engine is stopped and carburetor intake vacuum is terminated.